US006493363B1

United States Patent
Shuman et al.

(10) Patent No.: US 6,493,363 B1
(45) Date of Patent: Dec. 10, 2002

(54) AUTOMATED COUNTING INSECT ELECTROCUTOR

(75) Inventors: Dennis Shuman, Gainesville, FL (US); David K. Weaver, Bozeman, MT (US); Aharon Dagan, Gainesville, FL (US)

(73) Assignee: The United States of America as represented by the Secretary of Agricultural, Washington, DC (US)

( * ) Notice: Subject to any disclaimer, the term of this patent is extended or adjusted under 35 U.S.C. 154(b) by 0 days.

(21) Appl. No.: 09/079,163

(22) Filed: May 15, 1998

Related U.S. Application Data

(63) Continuation-in-part of application No. 08/556,054, filed on Nov. 9, 1995, now Pat. No. 5,907,559.

(51) Int. Cl.⁷ ................................................. H04J 3/04
(52) U.S. Cl. ..................................................... 370/539
(58) Field of Search ................................. 370/359, 263, 370/541, 539; 43/112, 114, 132.1; 701/207; 702/35, 116, 183; 73/587; 340/506, 942; 324/536; 342/411; 359/118; 379/69; 455/158.3

(56) References Cited

U.S. PATENT DOCUMENTS

| | | | | |
|---|---|---|---|---|
| 4,275,523 A | * | 6/1981 | Baima et al. | 43/112 |
| 5,090,153 A | * | 2/1992 | Mullen et al. | 43/114 |
| 5,206,596 A | * | 4/1993 | Beihoff et al. | 324/536 |
| 5,657,576 A | * | 8/1997 | Nicosia | 43/132.1 |
| 5,907,559 A | * | 5/1999 | Shuman et al. | 370/539 |

* cited by examiner

*Primary Examiner*—Dang Ton
(74) *Attorney, Agent, or Firm*—M. Howard Silverstein; John D. Fado; Gail E. Poulos

(57) ABSTRACT

A system for automated monitoring of pest insects having sensor units which include an insect electrocutor trap modified by the inclusion of electronic circuitry to sense, count and store the numbers of insects killed by it. The numbers of insects can be displayed at the electrocutor and/or transmitted to a remote computer that can acquire and time-stamp counts from thousands of distributed electrocutors for subsequent analysis and display. The data from the units is transmitted through a communications system which is organized into a two or more levels of multiplexing modules. Each multiplexing module has a plurality of inputs from next level multiplexing modules, with the exception of the last level multiplexing modules. The last level multiplexing modules have a plurality of inputs from sensor modules outputting data. A default condition is set up to allow transmission of address information from the computer to all the multiplexing modules to allow the programming of each multiplexing module to select one of its inputs. At the appropriate time, timing circuitry in the multiplexing modules reverse the direction of communication of the multiplexing modules to allow a single sensor module to transmit its data to the computer, in accordance with the address information.

18 Claims, 11 Drawing Sheets

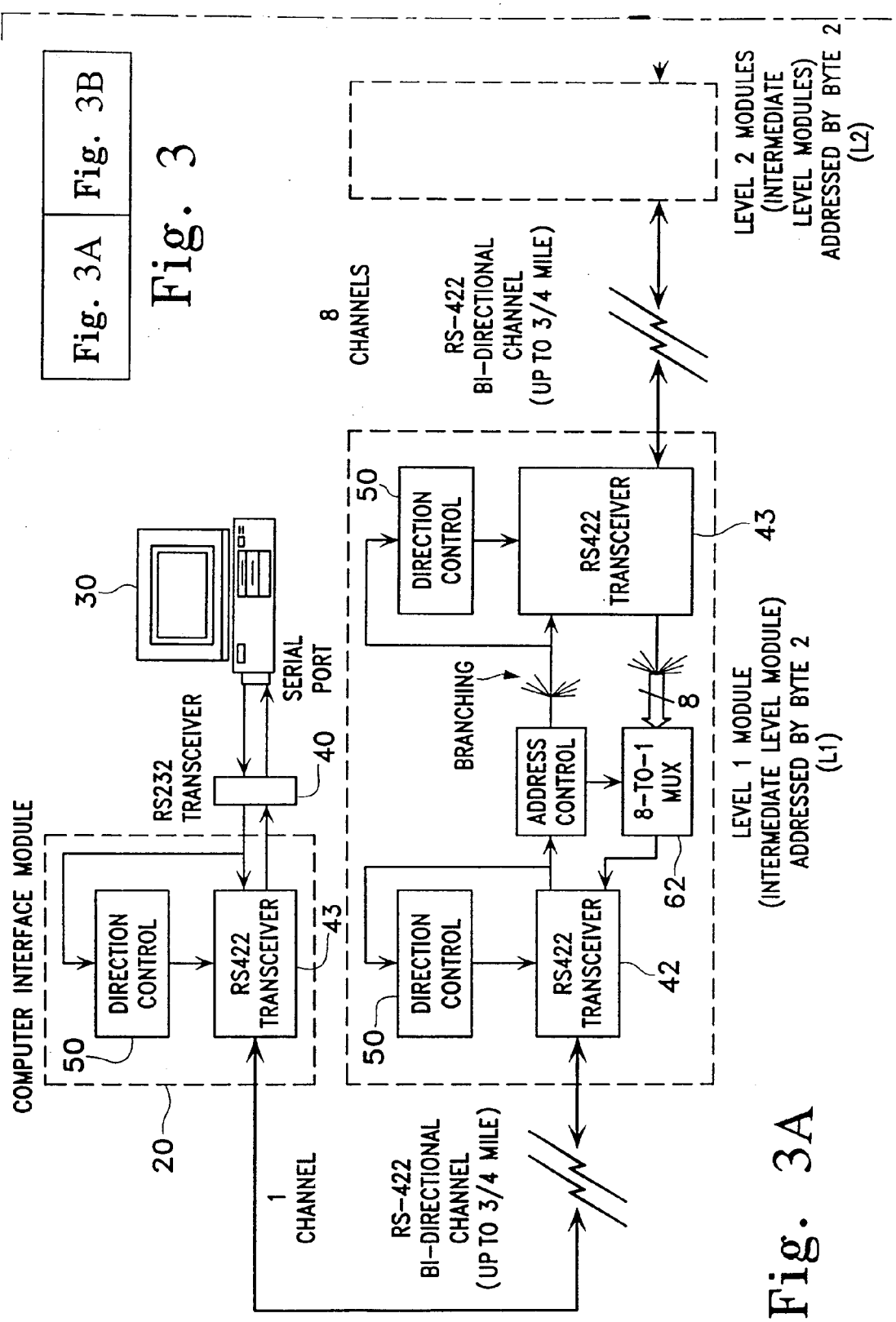

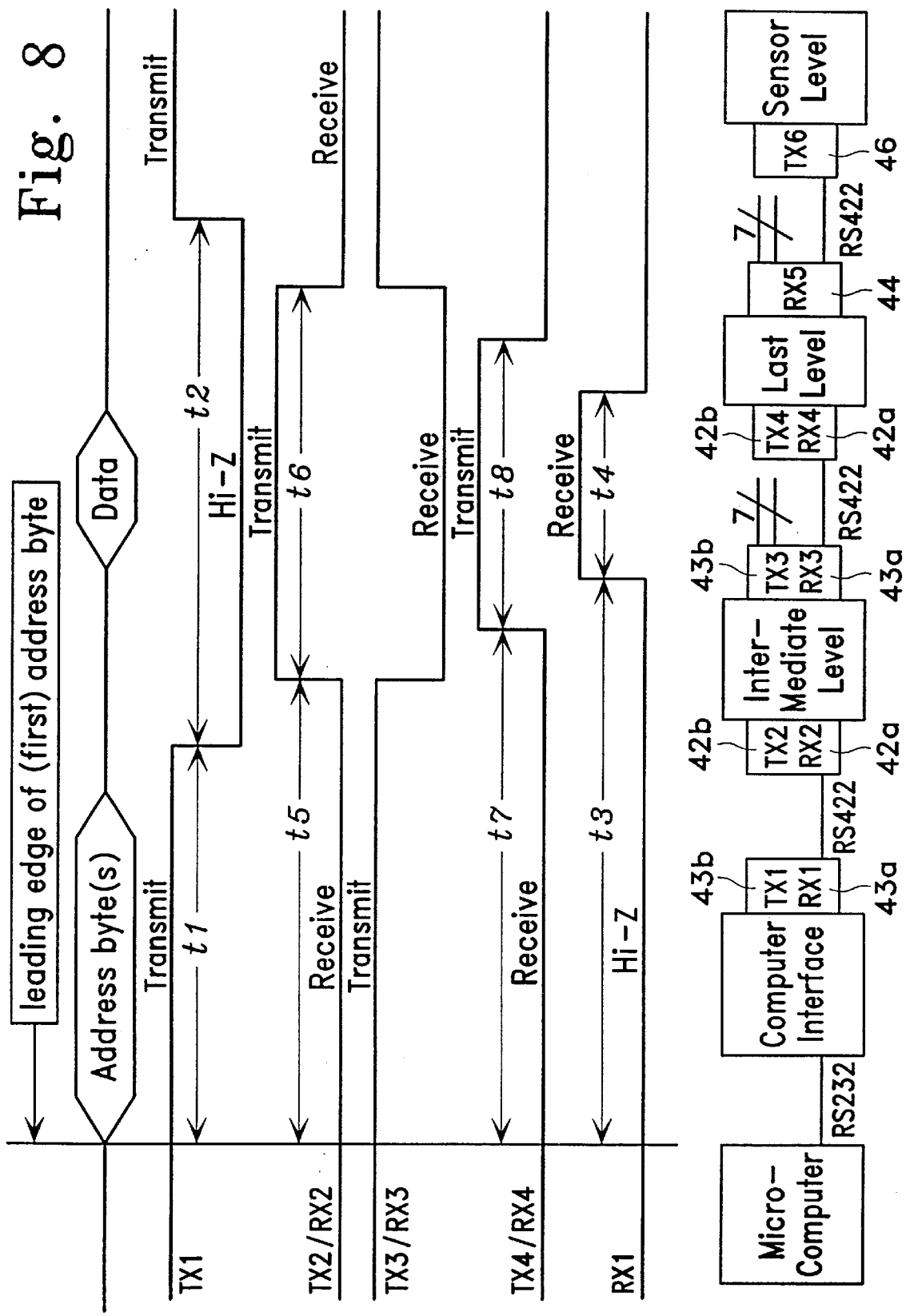

AUTOMATED COUNTING INSECT ELECTROCUTOR

This application is a continuation-in-part of application No. 08/556,054, filed Nov. 9, 1995 now U.S. Pat. No. 5,907,559.

BACKGROUND OF THE INVENTION

1. Field of the Invention

This invention generally relates to a system for monitoring a population of flying insect pests, especially throughout agricultural products storage volumes. It includes sensor units having automated counting insect electrocutor traps and associated count storage registers which are connected to a central computer through a tree type communications system utilizing a plurality of spatially distributed addressable multiplexing modules to access a specific register out of a large number of registers.

2. Description of the Related Art

Monitoring in agricultural contexts is becoming increasingly important for providing information about the status of stored-commodities and their environments. Stored-product insect pests, especially moths, are of great concern because they infest a broad range of commodities, such as dried fruits, nuts and packaged goods, leading to the loss of consumer confidence as well as product damage.

The state of the art in monitoring store-product moths is the use of pheromone baited traps. These traps must be manually inspected for numbers of insects caught which is labor intensive and results in infestation level data being updated infrequently. Electrocutors with ultraviolet lamps attached to attract insects are also sold for monitoring purposes, but they have the same shortcomings as pheromone traps as well as the difficulty of counting fragmented insects after electrocution. For accurate monitoring, each insect caught should only be counted once. With pheromone traps, the insect might fly around for awhile before and even after entering the trap, which can present a possibility for repeat counts. Furthermore, pheromone traps need to be serviced regularly to remove trapped insects and to replenish the pheromone.

The recommended placement for trapping flying insects is high off the ground which is inconvenient for trap inspection. Traps in remote storage bins can also be difficult to reach and can even present danger to the inspector.

U.S. Pat. No. 4,275,523 (Baima et al., '523) discloses a monitoring electrocutor trap which detects a discharge with a discharge detector connected to the trap which passes a signal to a transmitter which transmits it to a central receiver equipped with a discriminator for ignoring signals other than those from the transmitter and for passing the signals representing discharges to a pulse counter whereby a total of the number of insects trapped in a given time can be obtained at a central station without visiting each trap. The disclosed system further includes an astable circuit, which is interposed between the high voltage generator and a portable voltage source, such as an accumulator, operates to feed the high voltage generator from a battery at spaced intervals so as to lengthen the duration of the charge of the battery and therefore the duration of efficient operation of the device. The high voltage generator is capable of providing the high voltage even during those periods in which the astable circuit cuts off the supply from the battery. The signal transmitted to the central receiver can be a coded signal.

Monitoring is used to ascertain the efficacy of control measures, but some control methods, controlled atmospheres for example, are interrupted by or are inimical to trap inspectors.

In an integrated pest management system, the use of chemical treatments and other methods of insect control are dictated by the early and localized detection of infestations. Because of the physical distances involved in agricultural contexts, monitoring often involves inspecting many locations distributed over large areas. Automated monitoring systems involving computer acquisition of data from sensors distributed throughout stored-commodities eliminate the need for scheduling costly manual inspections and permits access to real-time data from all storage regions. These data can alert personnel to the need for control measures and can be input directly to expert management decision support systems. When electronic sensing is used, the practicality of monitoring is dictated by the economics of implementation. Often the major cost is not for the remote sensor hardware but rather is for the means of getting the data back into a computer at a central location. The direct approach of an individual cable for each sensor is physically unwieldy and economically impractical when hundreds or thousands of sensors are involved and the computer is thousands of feet away.

For example, W. J. Eradus discloses in *Intelligent Sensors and Agriculture* an "Agrinet" system where a master-slave relationship is set up between a computer and a plurality of sensors. The computer can poll every sensor to respond with measured data through a bus. However, Agrinet relies on the use of "intelligent sensors." These sensors usually include microcomputers to provide multiplexing, signal processing and handling of communications. These "intelligent sensors" are relatively expensive due to their complexity and thus limits the amount of sensors feasible for any one system.

John E. Judd discloses in a *Sensor Highway A New Cost Effective Approach to Multiple Point Data Collections for Plant Machinery*, a "sensor highway" system for collecting data from multiple point data collection sites. A controller sends a proper address code down one of three available buses connecting and powering a chosen sensor. The operator may then collect the data of that sensor. The sensor outputs are wired to a transducer adapter module (or TAM) which monitors incoming coded address data, provides connection to the sensors and provides an isolated direct two wire line to pre-conditioned sensors. The TAM is connected to the main highway via a branch of the sensor highway via a T adaptor or a pressed-on insulation displacement connector. However, the sensors of the sensor highway are limited to 250 per line and require multiple buses, increasing the amount of wiring necessary for the system and increasing its complexity and cost.

W. G. Gensler discloses another typical measurement system in the agricultural environment *An Electrochemical Water System*. Electronic equipment in the field make a multiplexed measurement from a probe. The data is serialized and encoded before being transmitted by an antenna. Again, the complicated structure for the transmission of the data results in a costly system which limits the number of sensors economically feasible.

While various methods have been developed for monitoring and trapping insects, there remains a need in the art for a system for remote monitoring of pest infestations which also eliminate the pest. The present invention provides a remote system for automatically counting flying insects as it kills them for monitoring infestation in many locations over large areas which is different from prior art methods.

SUMMARY OF THE INVENTION

It is therefore an object of the present invention to provide a monitoring system for pest insects which automatically records data indicative of the insect population levels local to each of an array of sensor units distributed throughout an insect monitoring volume.

Another object of the present invention is to provide a monitoring system having at least one sensor unit which includes an insect electrocutor trap, a sense coil operatively connected to a high voltage generator which is connected to said insect electrocutor, a signal conditioning circuit and a digital count storage register wherein the circuit operatively connects the sense coil to the register.

Another object of the present invention is to provide a monitoring system having at least one sensor unit including an insect electrocutor trap and a digital register which is operatively connected in parallel to a digital transmission network and a central computer which reads the register.

A further object of the present invention is to provide a simple method and device for monitoring pest insects in many locations distributed over large areas having at least one sensor unit which includes an insect electrocutor trap that is operatively connected to a digital register, and a central computer connected through a digital transmission network.

Another object of the invention is to collect data efficiently from a specific group of sensor units each unit including an insect electrocutor trap among a large number of sensor units.

A further object of the invention is to collect data from the large number of sensor units each unit including an insect electrocutor trap which are monitoring the status of the stored-commodities.

A still further object of the present invention is to provide a method for remotely sensing insects in a wide assortment of postharvest commodities wherein at least one sensor unit including an electrocutor trap, automatically counts an insect each time an insect flies through a metal set of parallel closely spaced, but not touching, metal grids on the trap and bridges across a high voltage which causes a current to flow through the insect and kills it. This method works best if all the sensors are operating continuously to detect insect activity. Individual sensor data can be locally reduced and accumulated as numbers of insects entering a trap. These numbers may be stored in digital registers and downloaded to a central computer at regular intervals. Digital transmission of the accumulated data is used to achieve accurate data communications over the long distances and potentially noisy environments encountered in storage facilities. Digital transmission is compatible with local accumulation of the reduced sensor data in digital registers (counters) and ease of acquiring this data by the digital computer. The registers should be addressable so that the computer can specify which register (of up to, for example, 1,048,576 registers) is being read. A priority in the design of the data transmission system is economic efficiency to minimize the cost, per sensor connected. Although slower than parallel communication, asynchronous serial computer communication with no control signals only requires a transmission (for addressing) and a reception (for sensor data) pathways. When the address and data lines are a pair of wires, the amount of wire is further reduced by a factor of two with a pathway time-sharing design so that after address information is transmitted by the computer, the pathways are reversed for the computer to receive the data. The amount of wire is also reduced by hardware multiplexing the pathways from the sensor registers so that only one register is connected to the serial port of the computer at a time. The sensor pathways are merged along the way to the computer by using spatially distributed multiplexing so that the pathways exhibit a tree structure with a single final pathway (trunk) connected to the computer. The minimization of wiring and other hardware is an important consideration where large numbers of sensors are utilized over large distances.

The distributed multiplexing is achieved by using a multi-level tree network and a modular approach. This allows for optimal customization as applied to different applications (not necessarily agricultural), including using any number of sensors in any spatial distribution. Each multiplexing level module contains a multiplexer that is programmed by one of several address bytes transmitted by the computer. When using an 8 to 1 multiplexer, the maximum number of sensor registers that can be addressed is $8^n$ where n is the number of multiplexing module levels.

In addition to minimizing the amount of cable needed, another factor that makes the communications system according to the present invention unique and substantially less expensive (on a per sensor serviced basis) is its extremely efficient hardware design that uses a minimal amount of simple, commercially available IC chips to accomplish the task for which it is designed (i.e., random access addressing and reading thousands of remotely distributed digital registers by an inexpensive PC type computer). Expensive multiple microprocessors and DSP chips providing "intelligent" sensors with distributed signal processing are unnecessary.

Error detection and correction during acquisition of sensor data may be accomplished by performing consecutive addressing and readings of each sensor register. This capability has no associated hardware cost and the additional time needed is not a concern in most pest control systems. Long distance transmission may be accomplished using RS-422 protocol which permits module levels to be separated by up to 1200 m without the use of additional repeaters. However, in applications where large numbers of sensors are relatively close, different module levels can be more efficiently housed together in a single chassis without the need of a connecting RS-422 link.

To further minimize hardware and cable costs, no control signals (handshaking) are employed. As a result, the sensor data registers are not told when to send their contents back to the computer. To accommodate this, the sensor data registers are connected to sensor level modules which continually read and serially transmit all the stored data to the previous (last multiplexing level) modules. Address bytes transmitted from a computer set all the multiplexers in all the multiplexing level modules to select the appropriate data lines so that ultimately only the one "addressed" sensor level module has a through pathway back to the computer. The time-sharing of the bi-directional channels between modules is conducted by direction control circuitry in each of these modules. The default direction is for address bytes from the computer to propagate downstream through the modules to the last multiplexing level modules. As a result, data bytes being transmitted by the sensor level modules are normally unable to reach the computer. After all the address bytes have been transmitted by the computer and the multiplexers have been properly set, the direction control circuitry temporarily reverses the channels so that the data byte transmitted by the selected sensor level module can travel back to the computer.

Other advantages and objects of the invention will become apparent in conjunction with the following detailed description.

BRIEF DESCRIPTION OF THE DRAWINGS

FIG. 8 illustrates a two multiplexing level example of the timing control of direction controllers according to the present invention.

DETAILED DESCRIPTION

Figure 1:
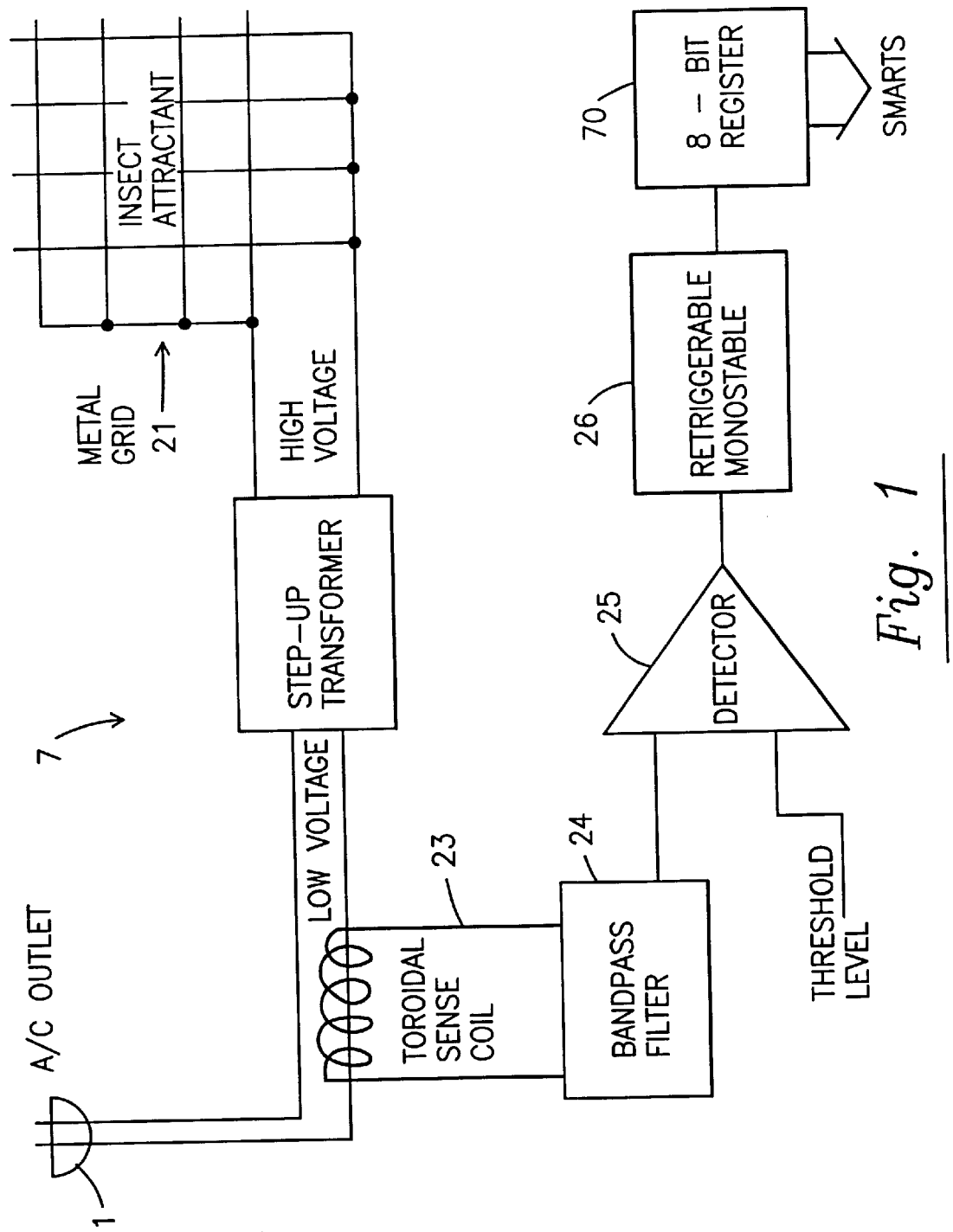
FIG. 1 illustrates the automatic counting insect electrocutor trap system 7 including a sensor unit having a insect electrocutor trap (not shown) with metal grids 21a and 21b, a high voltage generator 22, a sense coil 23, a band pass filter 24, a detector 25, a retriggerable monostable 26 and an eight bit digital register 70 which feeds into a digital communications system (SMARTS).

Throughout the following description, in conjunction with the drawings, elements having the same structure and which operate in the same manner will be described with reference to the same reference numeral in order to facilitate understanding of the invention.

The present invention is a system for monitoring a population of flying insect pests throughout a location, especially an agricultural products storage volume. It automatically and continuously records data indicative of the insect population levels local to each of an array of sensor units distributed throughout an insect monitoring volume. These data are automatically transmitted to a central computer where they are stored and displayed and the data can be input to a spatial statistics program for generating spatial population contours which can be used in precision targeting of appropriate insect control measures.

FIG. 1 illustrates a sensor unit 7 which is made up of an insect electrocutor trap that includes at least one electrical conductor means which is two or more parallel, closely spaced but not touching, metal grids 21a and 21b with a high voltage applied across them by a high voltage generator 22. The interior of the electrocutor trap contains an attractant which can include a blacklight, pheromones, food lures, etc. The pheromone can be a sex pheromone such as for example, [Z,E]-9,12-tetradecadien-1-yl acetate. A commercial electrocutor trap uses a light source, typically an ultraviolet (blacklight) fluorescent lamp as an insect attractant. These traps can be modified by removing the ultraviolet lamp and replacing the lamp with a pheromone or food lure. Insect electrocutor traps typically employ a step-up to transformer to raise utility company outlet voltage (about 117 VAC) to the high voltage needed to kill insects, usually about 3–8 kV. Electronic circuit enhancements can be used and high voltage can be derived from small household batteries of at least about 1.5 VDC. The two terminals of generator 22 are connected, one of each, to parallel grids 21a and 21b. Generator 22 is inductively connected to a sense coil 23 which inductively senses the current transient generated by an insect contacting grids 21a and 21b. A higher voltage transient is induced by coil 23. Generator 22 is operatively connected to power source 1. Coil 23 is operatively connected to a bandpass filter 24 which improves the signal to noise ratio (S/N) of the sense coil 23 output prior to signal detection by attenuating the quiescent induced noise voltage. When using a step-up transformer as generator 22, the noise spectrum is approximately 60 Hz and several of its harmonics while the signal spectrum and thus the desired filter bandpass is about 8–14 kHz. The preferred passband for the highest S/N is a function of the particular electrocutor trap employed. Bandpass filter 24 is operatively connected to signal detector 25 which is an amplitude threshold detector with the threshold level adjusted to not detect the attenuated induced noise voltage. Since the signal voltage transient waveform is sinusoidal with a number of peaks, the output of the detector when an insect is killed is a string of pulses. Detector 25 is operatively connected to a retriggerable monostable multivibrator 26 which converts the string of pulses from detector 25 to a single pulse. Multivibrator 26 has its time constant set to bridge the largest gap in a pulse string as empirically determined with a selected electrocutor. Multivibrator 26 is operatively connected to a digital eight bit register 70. Register 70 is incremented by the monostable output pulse from multivibrator 26. The numbers of insects counted at register 70 can be displayed at the electrocutor trap and/or transmitted to a remote central computer that can acquire and time-stamp counts from thousands of distributed sensor units for subsequent analysis and display. When register 70 transmits the numbers, it is operatively connected in parallel to a digital transmission network through which a central computer 30 reads digital count storage register 70 at regular intervals. If an application involves sensor data which can change by more than 256 units (for example, one unit equals a detected insect sound) during the polling cycle time, then a register overrun may occur and faulty data may result. In such an application, the sensor data could be reduced by further preprocessing (for example, setting one unit to equal 10 detected insect sounds), the polling cycle time may be decreased, or the sensor data could be stored in a 2-byte sensor register, rather than a 1-byte sensor register, resulting in a range of 0 to 65,535. In the latter case, the sensing system could address the 2-byte sensor register as two separate 1-byte registers.

Figure 2:
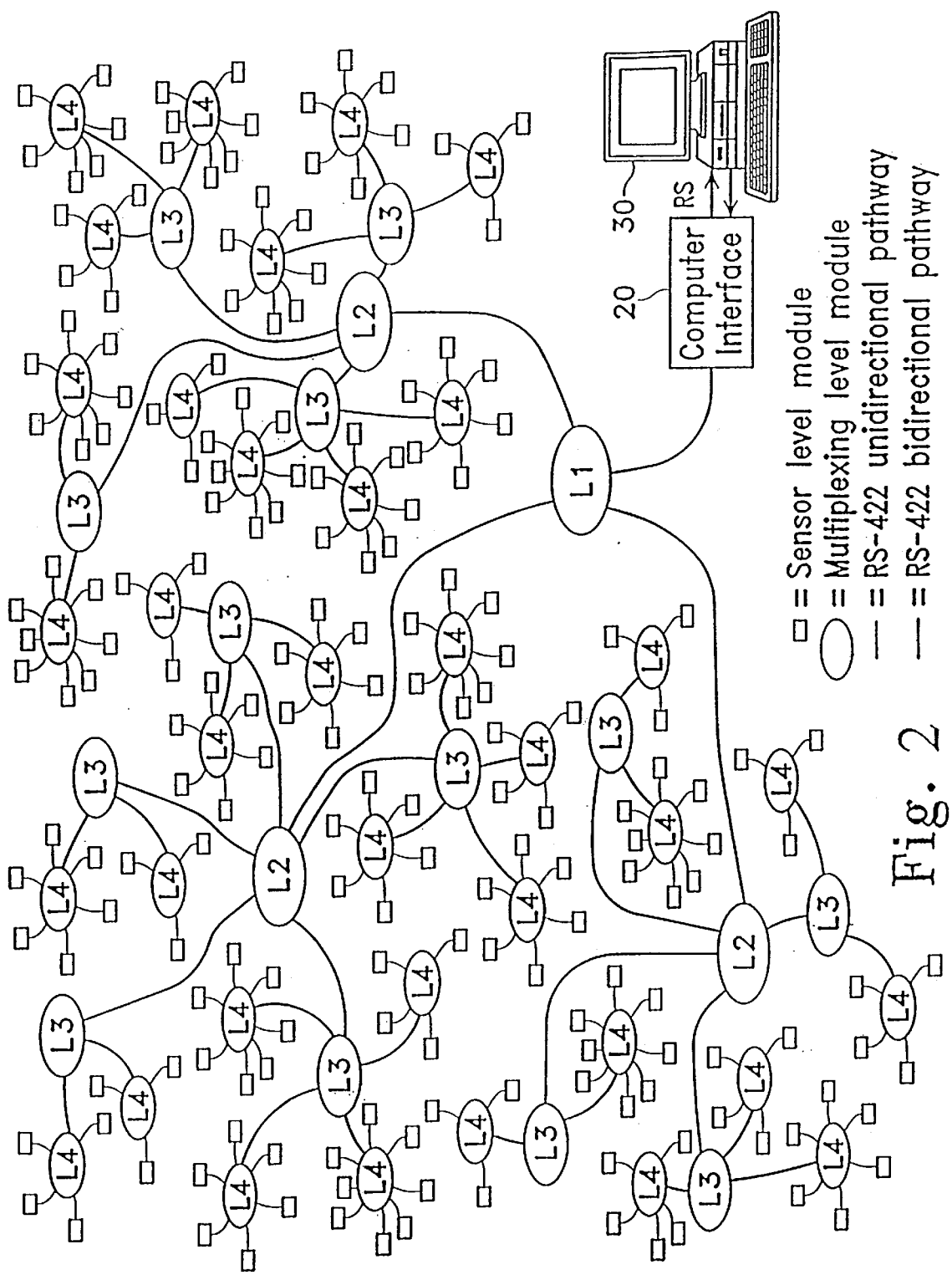
FIG. 2 illustrates the general tree structure of a four multiplexing level implementation example of the invention.

FIG. 2 illustrates the general structure of one example of the digital communication system which receives data from the digital register of the sensor unit. Computer 30, communicates through a computer interface module 20 to any one of a plurality of sensor modules via a tree structure. The tree structure comprises a plurality of multiplexing modules organized into several levels. Here, four levels of multiplexing modules L1–L4 are shown. The level one multiplexing module L1 is connected via an RS-422 pathway (here, a twisted pair of wires) to the computer interface 20. The level one multiplexing module L1 is also connected to each of a plurality of level two multiplexing modules L2 via separate twisted wire pairs. Similarly, each level two multiplexing module L2 is connected to a plurality of corresponding multiplexing modules L3 via twisted wire pair and each level three multiplexing modules L3 are connected to a plurality of corresponding multiplexing modules L4 via a twisted wire pair. Each of the level four multiplexing modules L4 are connected to one or more sensor modules.

In this example, only four levels of multiplexing modules are utilized. However, any number of levels of multiplexing modules may be utilized. For the addressing format and specific multiplexing modules described below, up to six levels of multiplexing modules can be utilized. Six levels of multiplexing modules allows access to 262,144 data registers, more than enough for most agricultural sensing applications. However, the number of data registers that can be accessed can be as high as about 1,048,576 if 16-input multiplexers are used. Also, the number of multiplexing modules a previous level multiplexing module can connect to (for example, the number of level two multiplexing modules L2 a level one multiplexing module L1 can connect to) is constrained by the multiplexer used in each multiplexing module and the number of inputs that multiplexer may select from. The multiplexing modules (in this example, level four multiplexing modules L4) connected to the sensor modules are referred to as "last level multiplexing modules" while the multiplexing modules connected between the last level multiplexing modules and the computer interface module 20 (in this example, level one, two and three multiplexing modules L1–L3) are referred to as "intermediate level multiplexing modules."

Figure 3:
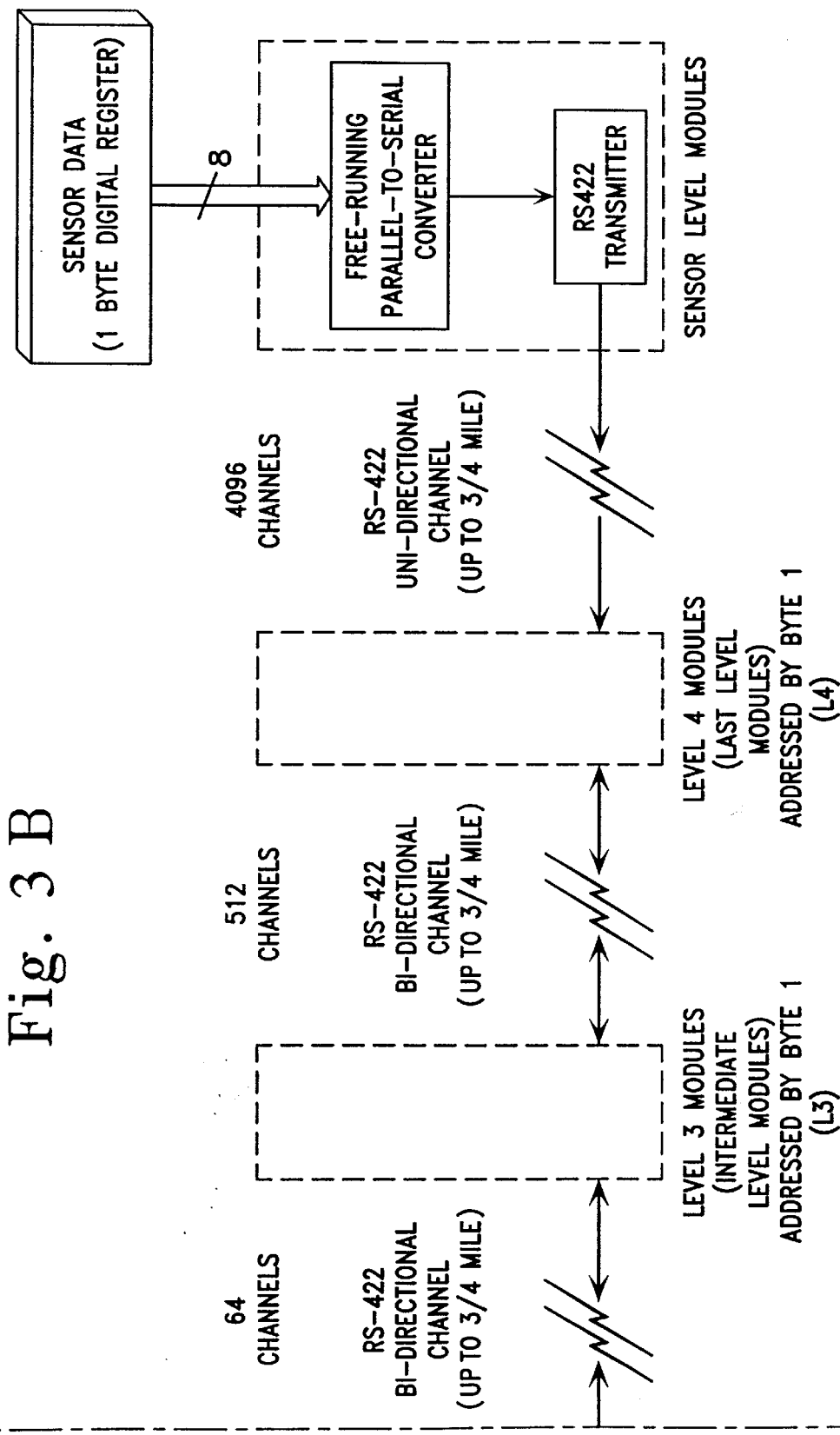
FIGS. 3a and 3b illustrate a four multiplexing level example of the tree type communication system according to the present invention.

FIGS. 3a and 3b illustrates more detail of the computer interface module 20, the intermediate multiplexing modules and the sensor level modules of the four level example of the tree type communication system of the present invention. Computer 30 communicates with a desired sensor module by programming each of the multiplexing modules to select an appropriate input. A total of two address bytes are sent via computer interface 20 through the tree structure to program all of the multiplexers 62 in multiplexing modules L1–L4. Each of the multiplexing modules receive addressing information from an upstream direction (address bytes from the computer) and retransmit the received address bytes, when appropriate, in the downstream direction to the next level multiplexing modules. When the multiplexing modules have been properly programmed with the address bytes, direction control circuitry 50 employed in each of the multiplexing modules and the computer interface module 20 reverse the direction of data flow for a predetermined time to allow the transmission of data from the addressed sensor module up through each level of multiplexing modules L1–L4 to the computer 30.

As will be noted, because only a single pair of twisted wires is utilized to connect the computer, the computer interface module and the multiplexing modules, and because each multiplexing module may be physically positioned at an optimum position, the amount of wiring necessary for connecting the computer to all the sensors is minimized, while still allowing the computer to retrieve data from a single specified sensor. Additionally, as will be seen below, the simplicity of each of the multiplexing modules and the computer interface result in a low cost communication system and do not unduly limit the number sensors feasible for any one sensing system.

Figure 4:
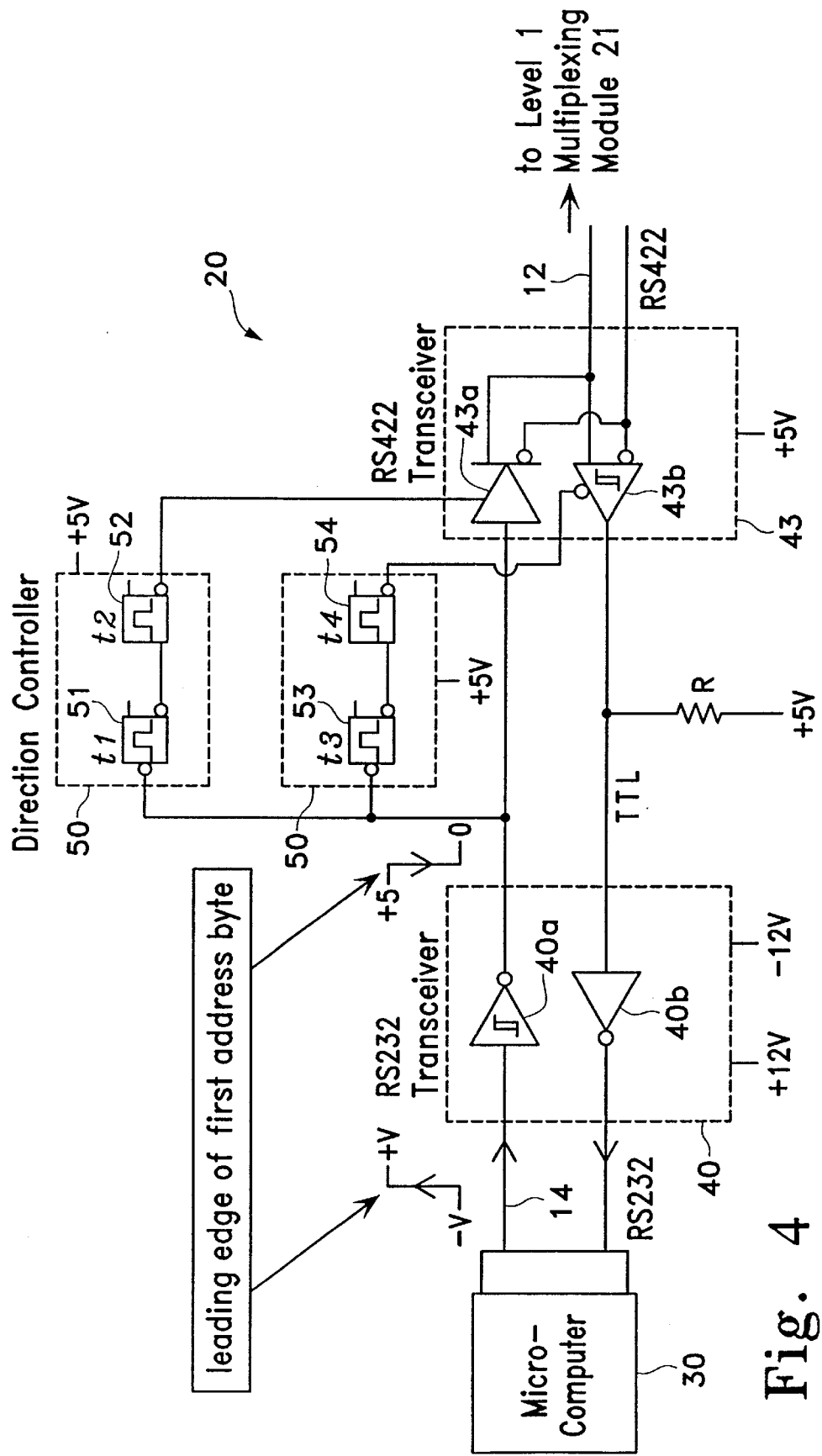
FIG. 4 illustrates an example of the computer interface module.
Figure 5:
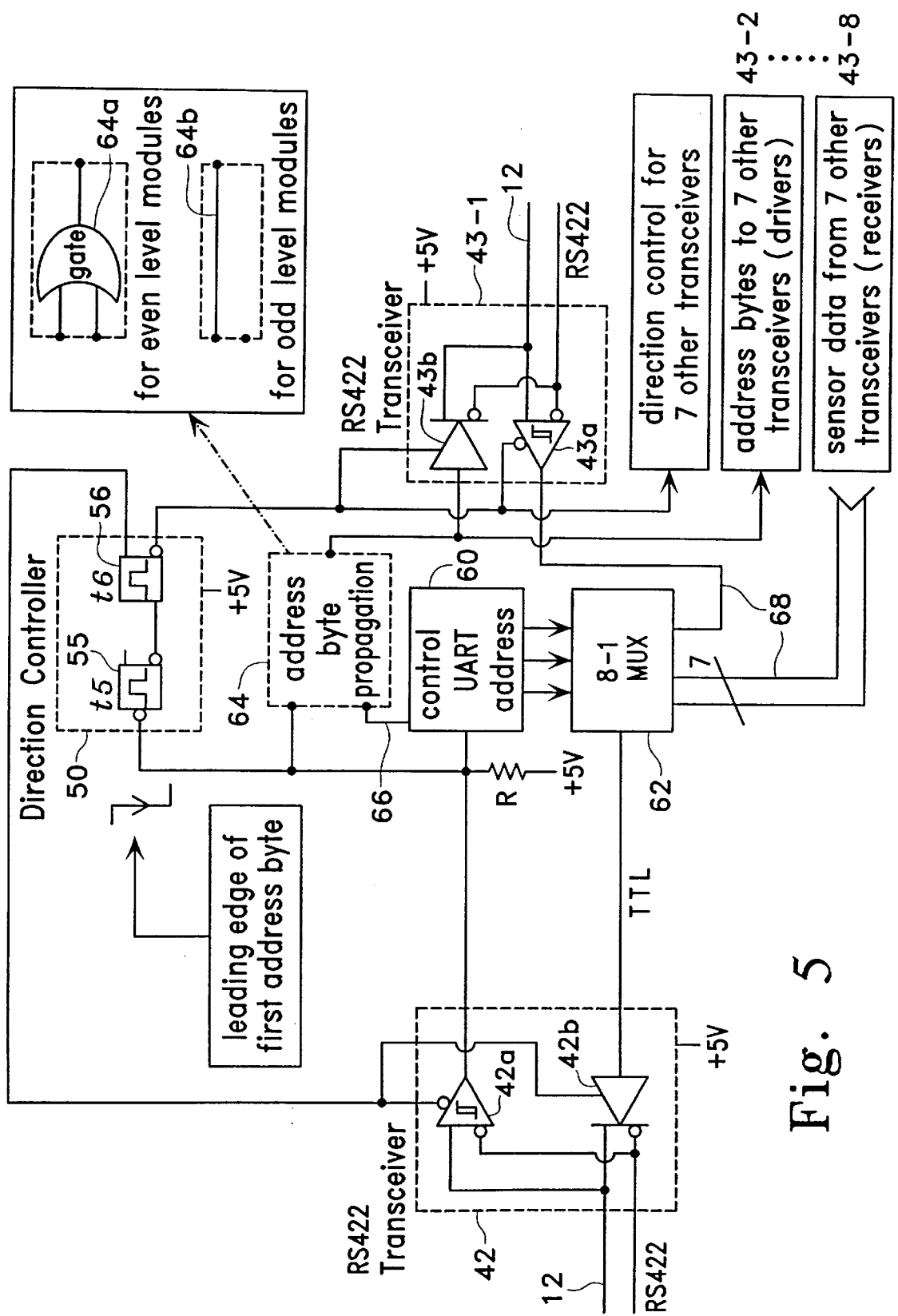
FIG. 5 illustrates an example of the intermediate multiplexing module.
Figure 6:
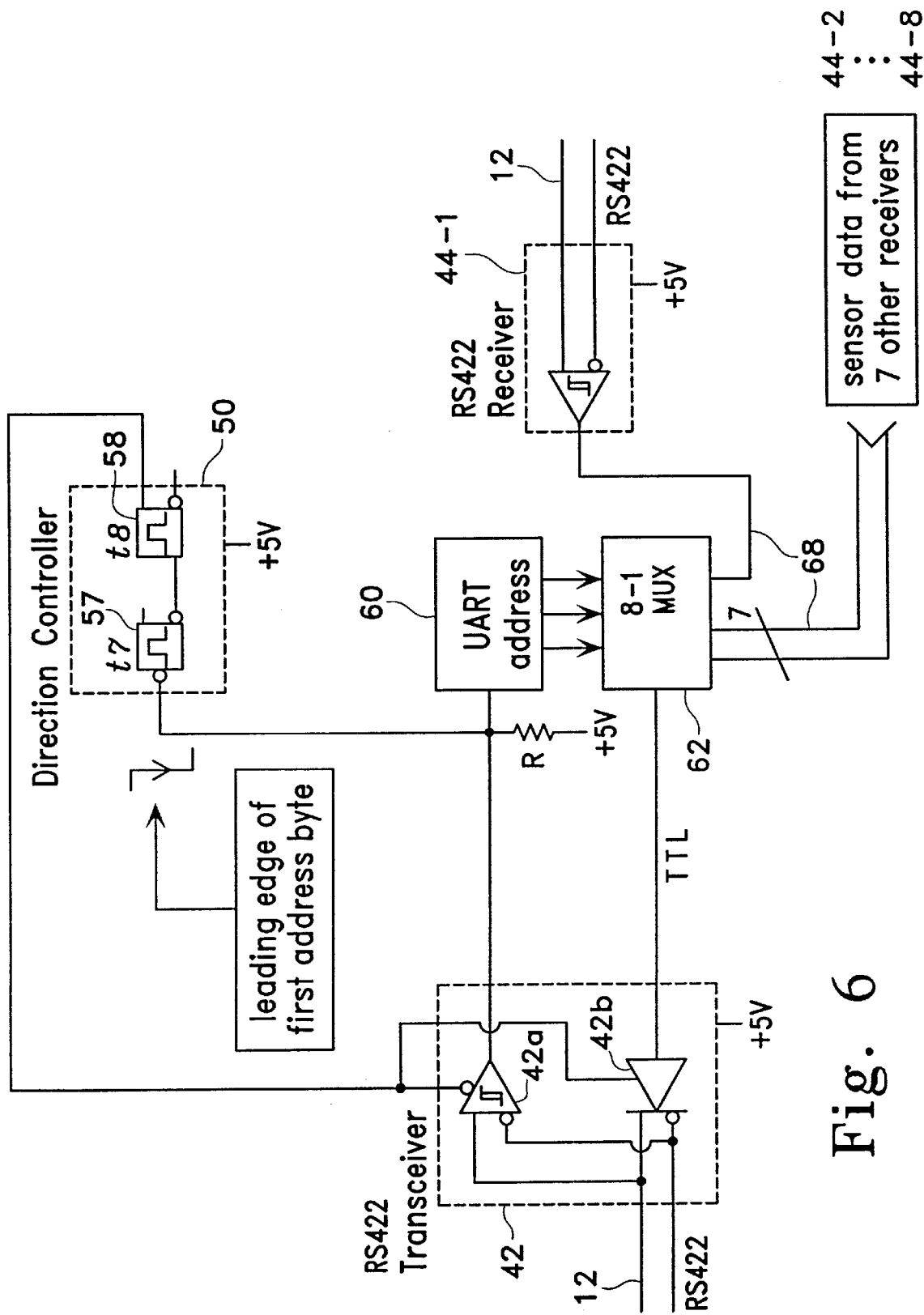
FIG. 6 illustrates one example of the last level multiplexing module.

FIGS. 4, 5 and 6 respectively illustrate examples of the computer interface module, an intermediate multiplexing module and a last level multiplexing module. These modules will be described for a system in which the distance between each module and the next level of communication (sensor level modules, other multiplexing modules or the computer interface module) is large enough to require RS-422 serial transmission along twisted wire pairs. However, when the multiplexing modules are placed close to their next level of communication, the multiplexing modules may not require a twisted wire pair for communication and the respective circuitry associated with such communication. Similarly, when distances are larger, different communication connections may be utilized such as the use of repeaters or radio frequency modems.

FIG. 4 illustrates an example of the computer interface 20 connected to the microcomputer 30. The computer may be programmed to format and transmit a sequence of any number of address bytes via its RS-232 serial port. In this example, the computer serially transmits two consecutive address bytes. These are received by the computer interface module, normally located next to the computer, where they are converted to TTL levels by receiver 40a in the RS-232 transceiver 40. The bytes are converted to RS-422 levels by the transmitter 43a in the RS-422 downstream transceiver 43 that is connected to RS-232 transceiver 40, for transmission to the level one multiplexing module L1. The default direction of the RS-422 transceiver 43 is for transmission of the address bytes downstream, towards the sensors; transmitter 43b is enabled and the receiver 43a is disabled. The default condition does not change until an addressing sequence is completed (discussed below).

If only a single pair of twisted wire is utilized between modules for each connection, addressing the multiplexing modules and receiving data from the data sensors must occur along the same pair of twisted wires. Because addressing and the receiving of data may not occur simultaneously, direction controllers 50 are utilized to control a transceiver's receipt and transmission of address information and data. Time-sharing of the twisted wire pair 12 is accomplished by reversing the enabled and disabled states of the transmitters and receivers in the transceivers on opposite sides of all the bi-directional pathways by signals generated by the direction controllers 50.

The computer interface module includes two direction controllers 50, each connected to receive an input from receiver 40a of the RS-232 transceiver 40. Each direction controller 50 includes a first multivibrator circuit in series with a second one shot. The first multivibrator circuits 51 and 53 (along with all first multivibrator circuits in all modules connected to bi-directional pathways) are triggered by the leading edge of the first address byte of an addressing sequence. The first direction control one shots 51 and 53 provide adequate delay for all further addressing to be completed and stabilized in the system before reversing transceiver enables and disables. Non-retriggerable multivibrator circuits are used so that delay periods are not affected by the additional bit transitions of the incoming address bytes. The minimum delay time needed is dependent on each individual installation, being mainly a function of the number of bytes in the addressing sequence and the address byte propagation delays associated with the lengths of the RS-422 pathways.

Second multivibrator circuits 52 and 54 are connected to receive the output of first multivibrator circuits 51 and 53 respectively. The second multivibrator circuits 52 and 54 are activated upon the deactivation of the first one shots 51 and 53, respectively. The second multivibrator circuits 52 and 54 when activated, respectively deactivate transmitter 43a and activate receiver 43b of transceiver 43, thus allowing data from a single sensor to be transmitted to the computer 30. Unlike the intermediate or last level multiplexing modules (discussed below), two direction controllers 50 are utilized to insure that noise or erroneous data is not transmitted to the computer 30 and misinterpreted as data. A separate direction controller 50 keeps receiver 43b disabled while all addressing and pathway direction reversals occur, thus keeping any noise or erroneous data from being transmitted through transmitter 40b of RS-232 transceiver 40 to computer 30.

The digital circuitry in the modules (multiplexers, gates, multivibrator circuits, UARTS) operate at TTL logic levels ("1"=+5V, "0"=ground). Therefore, each module has driver and/or receiver circuits to interface between the modules's TTL level circuitry and the RS-422 serial data pathways. Each module needs to be powered by a +5V source which may be shared by modules depending on their physical proximity to each other. The computer interface module also needs +12V and −12V power sources for compatibility with the computer's RS-232 port (available from the computer's internal power supply).

FIG. 5 illustrates an example of an intermediate level multiplexing module. An intermediate level multiplexing module are those multiplexing modules between the computer interface module 20 and the last level multiplexing module (which is connected to the sensor level modules). In the example illustrated in FIG. 2, the intermediate level multiplexing modules would be all level one, level two and level three multiplexing modules L1–L3. Address bytes are serially transmitted to the intermediate multiplexing module via the twisted wire pair 12 and received by upstream transceiver 42. The address bytes are converted to TTL levels by the receiver 42a in the RS-422 transceiver 42.

The output of receiver 42a of upstream transceiver 42 is connected to UART 60 which converts the address from a serial format to a parallel format. UART stands for Universal Asynchronous Receiver/Transmitter (UART) monolithic circuit chip which converts bytes between serial and parallel formats. Use of free-standing UARTs, which can be configured by hardwiring appropriate input pins high or low, (e.g., COM 8017, Standard Microsystems Corp., Hauppauge, N.Y., and HD-6402, Harris Semiconductor Corp., Melbourne, Fla.) is preferable for SMARTS's unintelligent modules, but UARTs designed to be programmed by microprocessors could be used with appropriate additional circuitry (e.g., with EPROMS). Although not shown, all UARTs should have a clock input from a baud rate generator which may be integral with, or external to, the UART.

The output of the receiver 42a of the upstream transceiver 42 is connected via an address byte propagation circuit 64 to a plurality of downstream transceivers 43-1 to 43-8. When the address byte propagation circuit 64 permits serial transmission of the address information (discussed below), the address information output by receiver 42 is further transmitted by transmitters 43b of transceivers 43-1 to 43-8 to the next level of multiplexing modules.

UART 60 outputs 3 bits of the address byte to program multiplexer 62 and a fourth bit, a control bit, to the address byte propagation circuit 64 in even level multiplexing modules.

The first address bytes set the multiplexing modules downstream. Subsequent address bytes are prevented from transmission to the downstream multiplexing modules to ensure the only appropriate address bytes are programming the correct levels. Whether or not an address byte passes through to the next level of multiplexing modules is dependent upon the control bit output on control line 66 and whether or not the intermediate level multiplexing module is an even level module or an odd level module. If the intermediate module level is an odd number, all address bytes pass through to the next level of multiplexing modules irrespective of the logic of the control bit on control line 66. If the intermediate modules level is an even number, whether or not the address byte is passed through is determined by an address byte propagation gate 64 controlled by the control bit made available by the UART 60 on control line 66. Specifically, in intermediate level multiplexing modules which are at an odd number level, there is a direct connection between the receiver 42a of the upstream transceiver 42 to the transmitters 43b of each downstream transceiver 43-1 to 43-8. Address byte propagation gate 64 in odd number level multiplexing modules consists of a simple connection 64b, connecting the output of receiver 42a and the transmitters 43b. Thus, all received address bytes will be further transmitted to the next level of multiplexing modules.

In intermediate level multiplexing modules whose level is an even number, address byte propagation gate 64 may be OR gate 64a or any type of circuitry which controls further transmission of subsequent address bytes as a function of a single control bit input. The receiver 42a of upstream transceiver 42 has its output connected to one input of the OR gate 64a and the control line 66 (housing the control bit made available by the UART) is connected to OR gate 64a as its other input. The output of the OR gate 64a is connected to the eight transmitters 43a of each of the eight downstream transceivers 43-1 to 43-8, to be transmitted to eight respective multiplexing modules of the next level. Thus, when the control bit on control line 66 provided by the UART 60 is low, the next address byte received will be propagated through the OR gate 64a and downstream transceivers 43-1 to 43-8 to the next level multiplexing modules. However, when the control bit on control line 66 is high, the next address byte will not be transmitted because the OR gate 64a will maintain a high output to downstream transceivers 43-1 to 43-8. Although this high output will be transmitted through the next level multiplexing module, this high output will not be interpreted to be a next address byte by a UART in a next multiplexing module because this high output does not contain any start bits (low level bits), necessary for a UART to recognize the beginning of a serial byte.

All the multiplexers on the same level are set to the same address. Since this address is encoded by three bits of an address byte (eight bits), each address byte sent by the computer is capable of setting the 8 to 1 multiplexers on two levels, using three bits to program a multiplexer on each level. The following table illustrates one example of the function of each bit of an address byte.

| ADDRESS BYTE FORMAT | | | | | | | |
|---|---|---|---|---|---|---|---|
| Gate Control | | MUX Data Select Inputs | | | | | |
| Function | Level 4 | Level 2 | Even Level Modules | | | Odd Level Modules | | |
| Symbol | $C_4$ | $C_2$ | $SE_2$ | $SE_1$ | $SE_0$ | $SO_2$ | $SO_1$ | $SO_0$ |
| Data bit | $D_7$ | $D_6$ | $D_5$ | $D_4$ | $D_3$ | $D_2$ | $D_1$ | $D_0$ |

Because one address byte is necessary to program two levels of multiplexing modules, the number of address bytes sent in an addressing sequence is a function of the number of multiplexing levels, which in turn is a function of the number of sensors utilized in a particular system. For example, two address bytes would be needed for either a three or a four multiplexing level system implementation. The following table shows for up to six multiplexing levels, the number of address bytes and maximum number of sensors able to be accessed.

IMPLEMENTATION SIZES*

| | Number of Multiplexing Module Levels | | | | | |
|---|---|---|---|---|---|---|
| | 1 | 2 | 3 | 4 | 5 | 6 |
| Number of Address Bytes | 1 | 1 | 2 | 2 | 3 | 3 |
| Max. No. of Addressable Registers | 8 | 64 | 512 | 4,096 | 32,768 | 262,144 |

*Using 8-input multiplexers and one address byte per two multiplexing levels.

In the more general case employing multiplexers with various numbers of inputs and having each address byte only program one multiplexing level, the maximum number of one-byte sensor registers that can be addressed in "m" where "m" is the number of multiplexer inputs per module and "in" is the number of multiplexing module levels. The following table shows the potential size of such networks. The different commonly available sizes of multiplexers are related to each other by powers of 2 so that a 64-input multiplexer is the functional equivalent of eight 8-input multiplexers on one level feeding to a single 8-input multiplexer on the next level. However, the former would have lower hardware costs while the latter could lower cabling costs if the sensor positions were spatially diffuse. Multiplexers with greater numbers of inputs may be preferable when large numbers of sensors are closer together or when a very large number of sensors are employed. It should be noted that the maximum number of sensors that could readily be serviced is 1,048,576 and can be accomplished by sing either 16 or 32-input multiplexers.

Maximum Number of Addressable Registers*

| No. of MUX Inputs | No. of Address Bits/ Byte | Number of Multiplexing Module Levels† | | | | | |
|---|---|---|---|---|---|---|---|
| | | 1 | 2 | 3 | 4 | 5 | 6 |
| 8 | 3 | 8 | 64 | 512 | 4,096 | 32,768 | 262,144 |
| 16 | 4 | 16 | 256 | 4,096 | 65,536 | 1,048,576 | NA |
| 32 | 5 | 32 | 1,024 | 32,768 | 1,048,576 | NA | NA |
| 64 | 6 | 64 | 4,096 | 262,144 | NA | NA | NA |

*Using one address byte per multiplexing level.
†Maximum number of allowable levels is determined by the number of available propagation gate control bits in each address byte.

To insure that address bytes only set the appropriate level multiplexers, only the first address byte is allowed to propagate through all the levels to the last level multiplexing modules. The propagation of subsequent address bytes in the addressing sequence are blocked by the address propagation gate 64 controlled by the control bit, (one of the two remaining bits of the address byte). Thus, by properly setting previous address byte's control bits, each subsequent address byte only reaches a diminishing subset of the multiplexing levels. Although earlier address bytes might temporarily set some multiplexers incorrectly as they propagate through the module levels, these multiplexers will eventually be correctly set by the remaining address bytes to establish the proper pathway between the computer and the desired sensor register before the direction of the RS-422 pathways are reversed.

A direction controller 50 is connected to the output of receiver 42a of upstream transceiver 42. Direction controller 50 includes a first multivibrator circuit 55 connected in series with a second multivibrator circuit 56. The output of the second multivibrator circuit 56 is connected to control the enabled and disabled states of the receivers and transmitters of the upstream transceiver 42 and the downstream transceiver 43-1 to 43-8. The intermediate level multiplexing module has a default state in which upstream transceiver 42 is set to receive and downstream transceivers 43-1 to 43-8 are set to transmit; that is, receiver 42a is enabled, transmitter 42b is disabled, each transmitter 43b is enabled and each receiver 43a is disabled.

When the first multivibrator circuit 55 detects the leading edge of the first address byte, the first multivibrator circuit operates for a specific time period in order to allow the remainder of the addressing sequence to occur. When the first multivibrator circuit 55 is deactivated, the second multivibrator circuit 56 is activated for a time period. The second multivibrator circuit 56 has an output to deactivate the receiver 42a of upstream transceiver 42 and activate the transmitter 42b of upstream transceiver 42. Similarly, the second multivibrator circuit 56 has an output to activate the receivers 43a of downstream transceivers 43-1 to 43-8 and to deactivate the transmitters 43b of downstream transceivers 43-1 to 43-8. When the second multivibrator circuit 56 is activated, the downstream transceivers 43-1 to 43-8 receive data from respective twisted wire pairs at their receivers 43a and output the received data to multiplexer 62 through data lines 68. Multiplexer 62, being previously programmed by three bits received from the UART 60, selects one of the outputs from receivers 43a of transceivers 43-1 to 43-8 on the data lines 68 and outputs the selected data line to transmitter 42b of the upstream transceiver 42, which in turn transmits the received data to the next module upstream.

The last level multiplexing module is a multiplexing module which communicates directly with one or more sensor modules. FIG. 6 illustrates one example of a last level multiplexing module. The last level multiplexing modules are similar in structure to the intermediate level multiplexing modules, but do not necessitate an address byte propagation gate nor a transceiver at the downstream end because there is no need to transmit address bytes any further downstream, as there are no more multiplexing modules to program. An upstream transceiver 42 is connected to a twisted wire pair 12 to receive address bytes via receiver 42a and transmit data via transmitter 42b. The receiver 42a of transceiver 42 has an output to UART 60 and direction controller 50. UART 60 has an output of 3 bits to program the 8 to 1 multiplexer 62. The 8 to 1 multiplexer 62 has a plurality of inputs (up to 8) from respective receivers 44, which in turn are connected to a twisted wire pair 12 to communicate with respective sensor level modules. The multiplexer has an output to transmitter 42b of transceiver 42.

Upon receipt of the address byte from receiver 42a of upstream transceiver 42, the UART 60 outputs three bits to program multiplexer 62. Multiplexer 62 receives data from one to eight sensors on data lines 68, data on lines 68 having been respectively transmitted from receivers 44-1 to 44-8, in direct communication with the sensor level modules. Multiplexer 62 selects one of the data lines 68 and transmits data on that line to transmitter 42b of upstream transceiver 42. As with the direction controllers of the intermediate level multiplexing module and the computer interface, direction controller 50 detects the leading edge of the first address byte and activates a first multivibrator circuit 57. When first multivibrator circuit 57 is deactivated, second multivibrator circuit 58 is activated to disable receiver 42a and enable 42b of upstream transceiver 42 for a specific time period. This then allows the data on the data line selected by multiplexer 62 to be transmitted to the upstream multiplexing modules and eventually to the computer.

Figure 7:
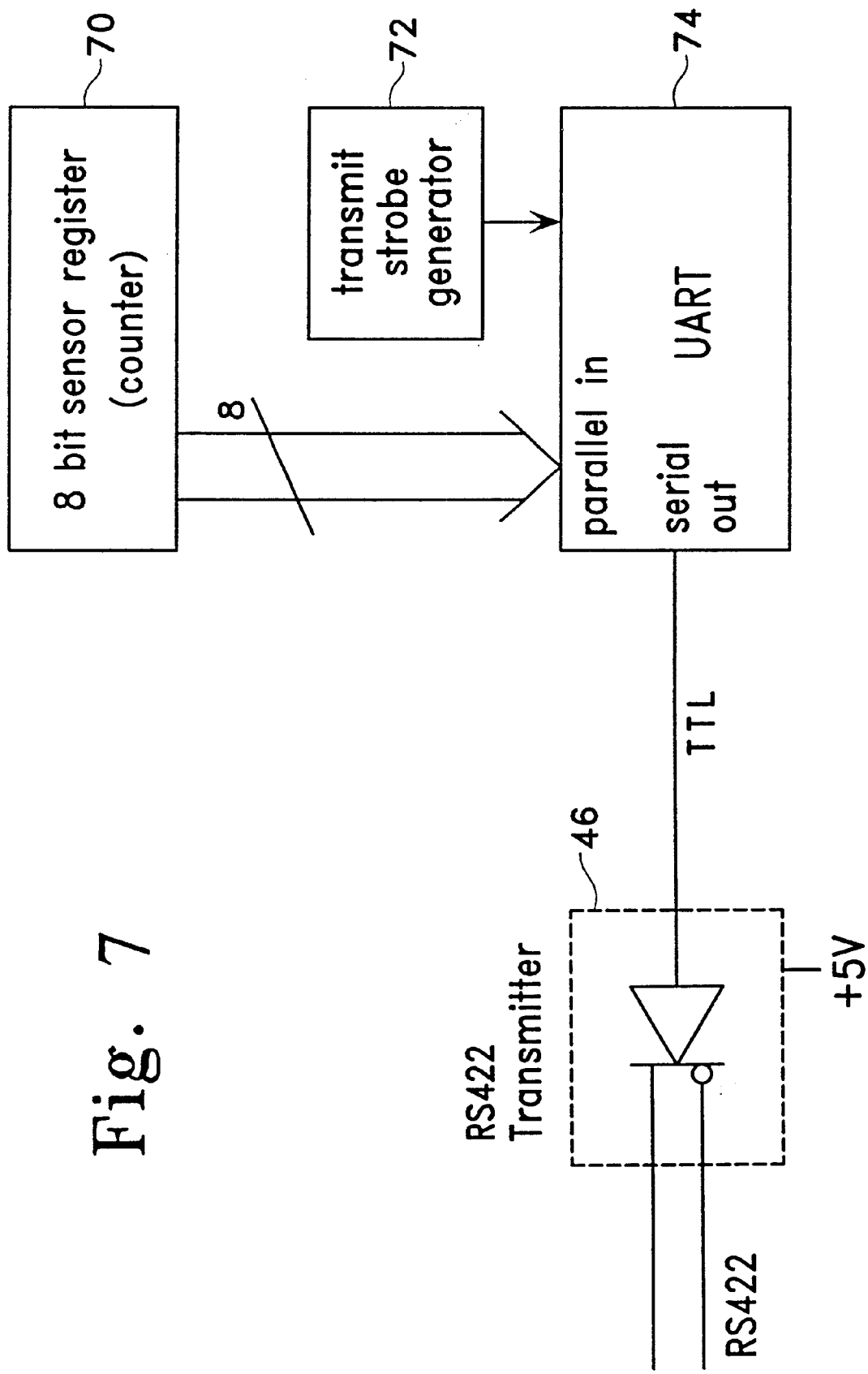
FIG. 7 illustrates one example of a sensor level module.

FIG. 7 illustrates one example of a sensor level module. An eight bit sensor register 70 stores data gathered due to monitoring, for example, a number of sounds detected reflecting the movement and feeding sounds of insects, or a number of insects entering a trap, detected with an infrared beam. The eight bit sensor register 70 outputs the data in parallel to UART 74. After parallel to serial conversion by UART 74 of the eight bit data from register 70, the serial data is output by UART 74 to transmitter 46 which transmits the serial data further upstream to upstream multiplexing modules.

Once an addressing sequence is completed, the sensor data stored as a digital byte can be transmitted to the computer. Direction controllers 50, based on the timing of their respective multivibrator circuits (triggered by the leading edge of the first received address byte) sequentially reverse the direction of communication for each of their transceivers. Each sensor level module UART 74 is continually reading its dedicated sensor register and transmitting its contents in a serial TTL format at a repetition rate dictated by a strobe signal from the transmit strobe generator 72. This serial data byte is converted to RS-422 format and sent out to a last level multiplexing module by an RS-422 transmitter 46. If this data byte's sensor register has just been addressed by the computer 30, the multiplexers in the multiplexing modules will select the appropriate data lines to allow serial transmission of the data byte to computer 30 when all direction controllers have reversed the communication direction of the RS-422 pathways between modules.

In operation, a flying insect contacts metal grids 21a and 21b and bridges across the high voltage generated by generator 22 (FIG. 1). A transient current flows through the insect which kills it. The circuitry of the present invention senses the transient current, performs spectral filtering with a bandpass filter 24, amplitude threshold detection with detector 25, and timing analysis with retriggerable monostable multivibrator 26 which produces a single pulse for each insect killed. Each pulse increments an eight bit digital count storage register 70 containing the total number of insects killed. This number is displayed at the electrocutor and/or is transmitted to a remote computer which can acquire and time-stamp counts from thousands of distributed sensor units for subsequent analysis and display.

Register 70 transmits to a remote computer through a digital transmission network such as that exemplified below as an addressing sequence in a six multiplexing module level implementation. Each address byte can program two levels of multiplexers (three bits for multiplexers of each level) and can control two levels of address byte propagation gates (one bit for the address byte propagation gates of each level). In this example, only level two and level four multiplexing modules have address byte propagation gates.

First, in all multiplexing modules (on levels two and four), all control bits on control lines 66 output from the UARTs 60 are set low. This may be done by repetitively sending the appropriate address byte with the control bit(s) equal to zero (when the system is initially powered up), or, the multiplexing levels may have their control bits set low through a previous addressing sequence. Then, three address bytes are sequentially sent by the computer to program the multiplexing levels. Because the UARTs in the level two and four multiplexing modules are outputting low control bits, all address byte propagation gates allow the first address byte to pass all the way through to correctly set the multiplexers on levels five and six. The first address byte has a first control bit set high to close the address byte propagation gate at level four so that the next address byte cannot pass beyond this level. Note that the first address byte incorrectly set the multiplexers on levels one through four.

Because the address byte propagation is now closed on level four, the second address byte only passes through to level four. The address byte propagation gates at level four prevent any further transmission of the second address byte to levels five and six. The second address byte correctly sets the multiplexers on levels three and four. The second address byte may also have the first control bit set low to open the address byte propagation gate at level four (in preparation for the next sequence of address bytes,) and has a second control bit set high to close the address byte propagation gate at level two so that the next address byte cannot pass beyond this level. The second address byte also incorrectly sets the multiplexers on levels one and two.

Because the address byte propagation gate is now closed on level two, the third address byte only passes through to level two and it correctly sets the multiplexers on levels one and two. By having the second control bit set low, the third address byte may open the address byte propagation gate at level two in preparation for the next sequence of address bytes. The addressing sequence is thus completed with all address byte propagation gates set open to allow propagation of the first address byte of the next addressing sequence to levels five and six.

The below table summarizes the functions of each address byte in the above six multiplexing level addressing sequence as well as for other communication systems having one to five levels of multiplexing modules.

| | ADDRESS BYTE FUNCTIONS | | | | | |
|---|---|---|---|---|---|---|
| Address | Multiplexing Module Level | | | | | |
| Byte No. | 1 | 2 | 3 | 4 | 5 | 6 |
| 1 | — | OG | — | CG | SM | SM |
| 2 | — | CG | SM | OG, SM | | |
| 3 | SM | OG, SM | | | | |
| | 1 | 2 | 3 | 4 | 5 | |
| 1 | — | OG | — | CG | SM | |
| 2 | — | CG | SM | OG, SM | | |
| 3 | SM | OG, SM | | | | |
| | 1 | 2 | 3 | 4 | | |
| 1 | — | CG | SM | SM | | |
| 2 | SM | OG, SM | | | | |
| | 1 | 2 | 3 | | | |
| 1 | — | CG | SM | | | |
| 2 | SM | OG, SM | | | | |
| | 1 | 2 | | | | |
| 1 | SM | SM | | | | |
| | 1 | | | | | |
| 1 | SM | | | | | |

OG = Open Address Byte Propagation Gate,
CG = Close Address Byte Propagation Gate,
SM = Set Multiplexer to select appropriate input data line.

FIG. 8 illustrates an example of the timing control of the multivibrator circuits of the direction controllers throughout a two multiplexing level implementation of the communication system according to the present invention. It is necessary to insure that transmitters on both ends of a pathway (a connection of an upstream and downstream module) are never in their enabled states at the same time. This would result in two transmitters transmitting to each other simultaneously, which could result in the destruction of the transceivers (when two different output voltages are connected together). To avoid this possibility, the timing of the direction control multivibrator circuits should be controlled as illustrated in the example in FIG. 8. In this two multiplexing level implementation, first the computer interface module transmitter TX1 (43b) connected to the intermediate level module is disabled (at time $t_1$) before the transmitter on the other side of the pathway TX2 (42b) is enabled and the receiver RX2 (42a) is disabled (a time $t_5$). Likewise, the intermediate level module transmitter TX3 (43b) connected to the last level module is disabled (at time $t_5$) before the transmitter on the other side of the pathway TX4 (42b) is enabled and the receiver RX4 (42a) is disabled (at time $t_7$). Finally, the computer interface module receiver RX1 (43a) connected to the intermediate level module is enabled (at time $t_3$) to receive the data byte from the selected sensor register. This data byte is then sent to the computer via the RS-232 transceiver.

Referring back to FIG. 4, it should be noted that the computer interface module receiver 43b of downstream transceiver 43 (RX1) is only enabled for the short time interval $t_4$ by a separate direction controller 50 than the one controlling the transmitter 43a. The rest of the time receiver 43b is effectively disconnected (high impedance output) from the transmitter 40b of the RS-232 transceiver 40. This insures that noise and erroneous data from the network do not reach the computer since this last pathway is not established until all addressing functions and pathway direction reversals have settled. The input line to the RS-232 transmitter 40 is kept from floating while the RS-422 receiver 43b (RX1) is in its high impedance output state by connecting the line high ('mark') through resistor R, thus eliminating problems due to noise induction on this line that would reach the computer. (In a similar manner in FIGS. 5 and 6, the serial input lines to the UARTS are connected high through resistors R to prevent erroneous operation of the UARTs and the direction controllers.)

Data bytes are continually being transmitted by the selected sensor level module at a repetition rate set by the transmit strobe generator 72 of each sensor module. Thus, the computer interface module receiver 43b (RX1) of transceiver 43 might become enabled in the middle of a transmitted data byte. For this reason, the time interval $t_4$ is made long enough to insure the reception of two data bytes. This allows the computer to discard the first (possibly truncated) byte but retain the second. That is:

$t_4 > 2$/transmit strobe generator repetition rate.

To insure that a truncated first byte does not interfere with the computer's ability to capture the second byte, the minimum time interval between the data bytes must be equal to the length of a data byte (including the start and stop bits). Therefore (with one stop bit):

transmit strobe generator repetition rate<baud rate/20

After the end of the time interval $t_4$, all the transmitters and receivers in the RS-422 transceivers revert to their default enabled and disabled states in the reverse order to again insure that both ends of a pathway never have transmitters enabled simultaneously. The time delay needed between reversing the enabled state of the transmitter on one side of a bi-directional pathway and reversing the disabled state of the transmitter on the other side (e.g., $t_7$–$t_5$) is a function of the switching times of the transceivers, the propagation delays associated with the lengths of the RS-422 pathways, and the tolerances of the multivibrator circuits' output pulses. As one in the art would recognize for implementations with more multiplexing levels, the timing change of FIG. 8 should be expanded to have the same staircase pattern of timing waveforms but with more intermediate steps.

The number of inputs to each multiplexing level modules is flexible, being a function of where the sensors are located in each individual sensing application. Also, the minimum number of levels of multiplexing modules is dictated by the number of sensors desired in each sensing system. When multiplexing level modules utilize an eight to one multiplexer, the maximum number of 1-byte sensor registers that can be addressed is $8^n$, where n is the number of multiplexing module levels. As is shown by table 1, when utilizing only six module levels, 262,144 sensors can be serviced. Furthermore, because each register may be individually addressed, the communication system according to the present invention allows the polling of registers in any desired order and at any time.

Error detection and error correction during acquisition of sensor data may be performed by taking several repetitive readings of each sensor register and checking for consistent results. Therefore, there is no need for additional hardware. The additional time for repetitive readings of each sensor is not of major importance in insect monitoring since changes in insect populations occur over days rather than within seconds. As an example, in an implementation with 1,000 sensor registers (4 levels), five consecutive readings (per sensor register) for error protection, with a baud rate of 300, a minimum polling time (to cycle through all 1000 registers) would be roughly 15 minutes. The computer, after storing the sensor register data, can calculate the change that has occurred during the polling cycle time, and thus, there would be no need to clear the register after reading it.

Note, however, if an application involves sensor data which can change by more than 255 units (for example, one unit equals a detected insect sound) during the polling cycle time, then a register overrun may occur and faulty data may result. In such an application, the sensor data could be reduced by further preprocessing (for example, setting one unit to equal 10 detected insect sounds), the polling cycle time may be decreased, or the sensor data could be stored in a 2-byte sensor register, rather than a 1-byte sensor register, resulting in a range of 0 to 65,535. In the latter case, the sensing system could address the 2-byte sensor register as two separate 1-byte registers.

Figure 9A:
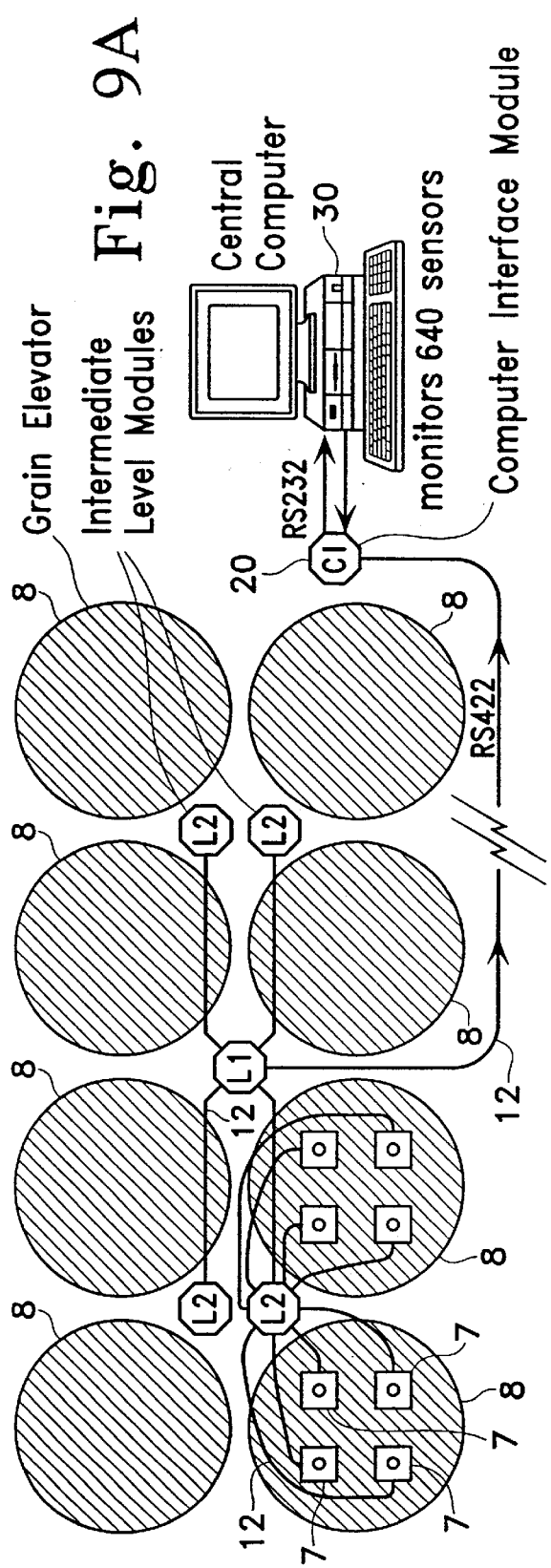
FIGS. 9A, 9B and 9C illustrate another four multiplexing level example of the invention in which distances between sensor modules, last level multiplexing modules and intermediate multiplexing modules are small.
Figure 9B:
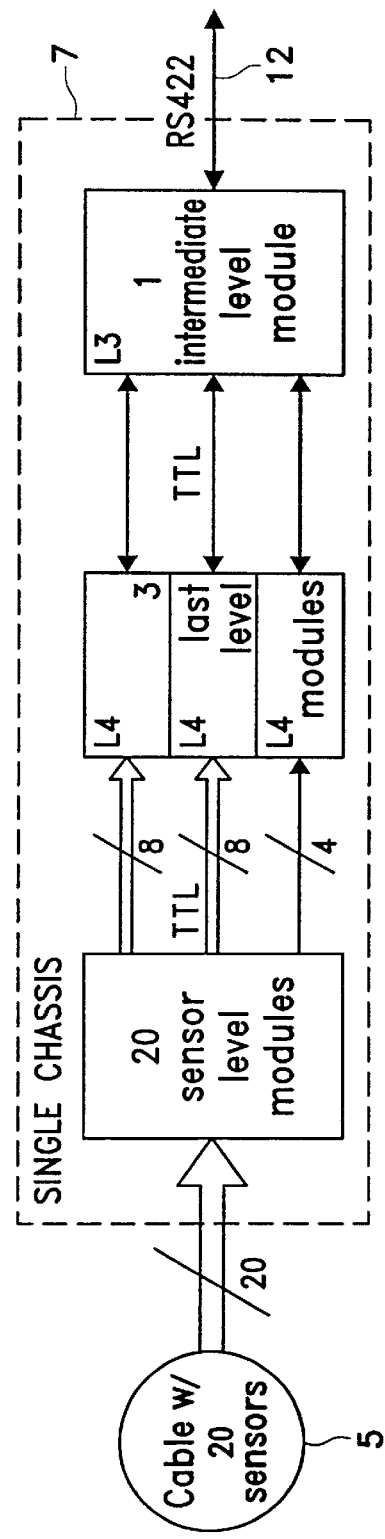

FIG. 9A illustrates another example of the invention in which the distances between sensor modules last level multiplexing modules and an intermediate multiplexing module are small. Multiple grain elevators 8 have a plurality of sensors placed within. In this example, each grain elevator contains four sensor groups 7. As shown by FIG. 9B, each sensor group 7 includes a cable along which 20 sensors are placed. Each sensor is connected to a respective sensor level module 6. Each sensor level module 6 includes an eight bit sensor register which stores the data reflecting the monitoring of the sensor (for example, a number of sounds detected reflecting the movement or feeding of insects, or a number of insects entering a trap detected with an infrared beam).

Three last level modules L4 connect each of the outputs of the twenty sensor level modules to an intermediate level module L3. In the example, two of the last level modules L4 may each receive data from eight of twenty sensor level modules 6, while one last level module L4 receives data from four of the sensor level modules 6. Each of the last level sensor modules L4 output respective data of a selected sensor module to intermediate level module L3. Similarly, intermediate level module L3 selects one of the data inputs from the three last level modules L4 and outputs that data via a twisted wire pair 12 in an RS-422 format. Because, in this example, the sensors are located relatively near to each other, communication between the sensors 5, the sensor level module 6, the last level modules L4 and the intermediate level module L3 may occur.

As shown by FIG. 9A, each sensor group 7 is connected via the twisted wire pair 12 to a level two intermediate multiplexing module L2. Each level two multiplexing module L2 selects one output from eight sensor groups 7 and transmits that output via twisted wire pair 12 to a level one multiplexing module L1. The level one multiplexing module L1 in turn selects one of four inputs of the respective level two intermediate multiplexing modules L2, and outputs the data from the selected module via a twisted wire pair 12 to the computer interface module 20 and the central computer 30.

Figure 9C:
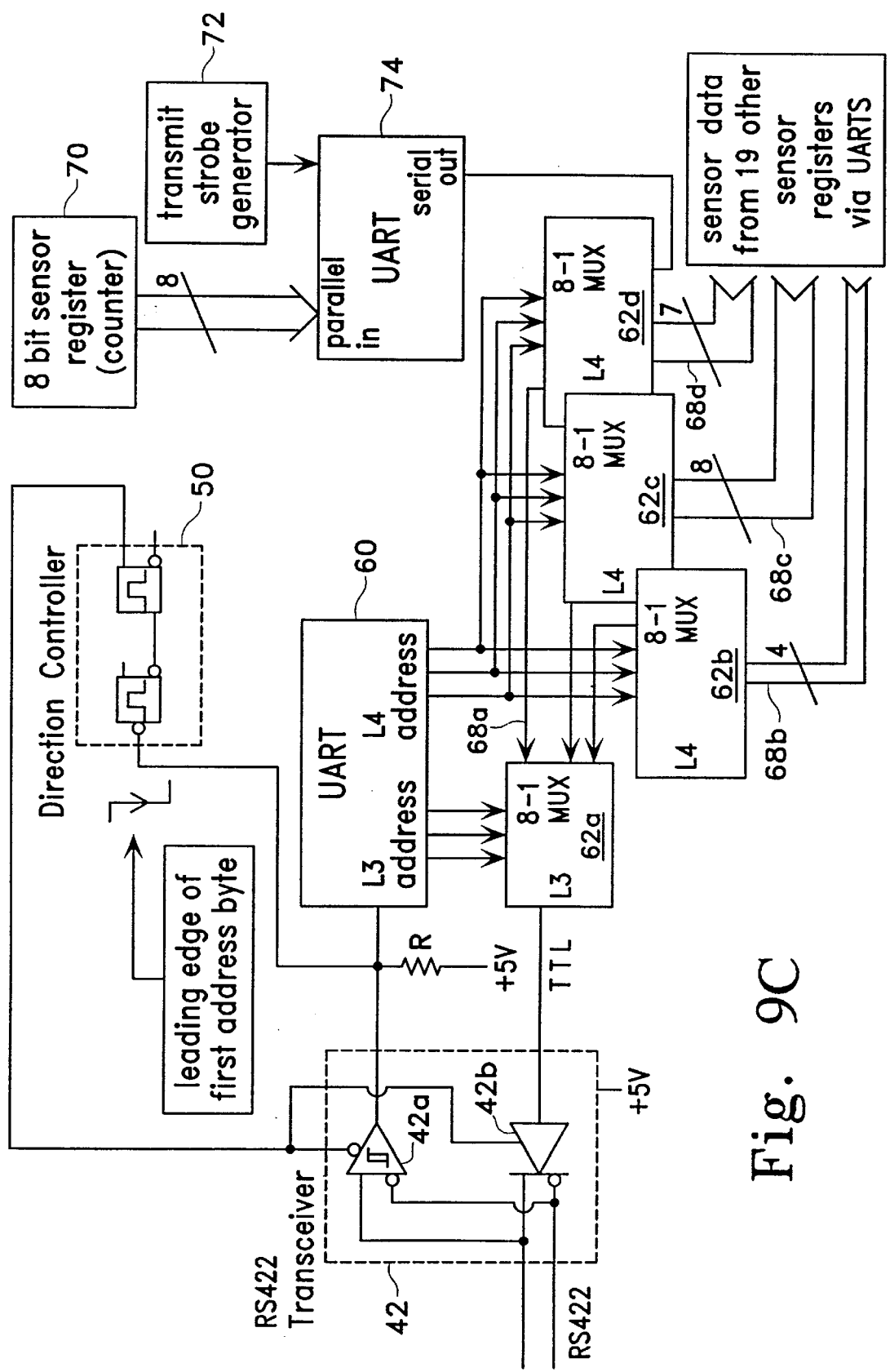

As shown by FIG. 9C, because the sensor registers 70, the level four multiplexers 62b, 62c and 62d, and level three multiplexer 62a may be located close to each other, the transmitters of the sensor modules, the receivers, transceivers and associated direction controllers of the last multiplexing modules (level four) and the downstream transceiver of the level three intermediate multiplexing module are unnecessary. Furthermore, because a UART outputs an entire address byte, only one UART is necessary to program two levels of multiplexers. Thus the structure of communication system of the invention is further simplified. The addressing and direction control operations are the same as in the previous embodiment so that use of multiple levels of multiplexing modules in a single chassis does not necessitate a change in operation of the entire tree type communications system.

The invention is not intended to be limited to the above described embodiments. Many variations will be obvious to one of ordinary skill in the art while still encompassing the spirit of the invention. For example, while the specific embodiments above utilize 8 to 1 multiplexers, other size multiplexers can be used. The below table shows examples of utilizing different size multiplexers, where each multiplexing level is properly set by a different address byte.

MAXIMUM NUMBER OF ADDRESSABLE REGISTERS*

| No. of MUX Inputs | No. of Address Bits/ Byte | Number of Multiplexing Module Levels† | | | | | |
|---|---|---|---|---|---|---|---|
| | | 1 | 2 | 3 | 4 | 5 | 6 |
| 8 | 3 | 8 | 64 | 512 | 4,096 | 32,768 | 262,144 |
| 16 | 4 | 16 | 256 | 4,096 | 65,536 | 1,048,576 | NA |
| 32 | 5 | 32 | 1,024 | 32,768 | 1,048,576 | NA | NA |
| 64 | 6 | 64 | 4,096 | 262,144 | NA | NA | NA |

*Using one address byte per multiplexing level.
†Maximum number of allowable levels is determined by the number of available propagation gate control bits in each address byte.

To accomplish this, all intemediate level multiplexing modules should have address byte propagation gates. Since larger multiplexers require more address bits to select a single input, there are less bits available to control the propagation gates and thus less multiplexing levels can be used. The optimal multiplexer size to use in a system is a function of the number and spatial distribution of the sensors to be serviced. In general, larger multiplexers are preferable when large numbers of sensors are closer together. The different commonly available sizes of multiplexers are related to each other by powers of 2 so that a 64-input multiplexer is the functional equivalent of eight 8-input multiplexers on one level feeding to a single 8-input multiplexer on the next level. However, the former would have lower hardware costs while the latter could have lower cabling costs if the sensor positions were spatially diffuse. It should be noted that the maximum number of sensors that could readily be serviced is 1,048,576 and can be accomplished by using either 16 or 32-input multiplexers. Although the 8-input multiplexer implementation shown in the above table has the same maximum numbers of addressable registers as the embodiments described previously, it is less preferable since it can require twice as many bytes in its addressing sequence (one byte per multiplexing level) and more address byte propagation hardware.

It also will be obvious to those skilled in the art that the invention may be utilized in other fields where a plurality of sensors are distributed over distances, for example, in monitoring industrial processes. Also, many of the specific components referred to in the above examples will be recognized by those skilled in the art to be unnecessary to the spirit of the invention. The scope of the invention is intended to be limited only by the following claims.

What is claimed is:

1. An automated insect monitoring system comprising:
a plurality of sensor units wherein each of said units comprises:
an insect electrocutor trap operatively connected to a high voltage generator;
a sense coil operatively connected to said generator;
a signal conditioning circuit operatively connected to said coil;
a digital register operatively connected to said circuit; and
a communications system, operatively connected to said register of each of units of said plurality of sensor units, for receiving data from a plurality of spatially separated locations containing sensor units comprising:
a computer operatively connected to said register of each of units of said plurality of sensor units;
a first multiplexing module operably connected to the computer;
a plurality of second multiplexing modules each operatively connected to the first multiplexing module as a plurality of inputs for the first multiplexing module;
a plurality of intermediate levels, each level containing a plurality of multiplexing modules, each module operably connected to a lower level module as a plurality of inputs for said lower level module;
a plurality of last level multiplexing modules, each operatively connected to a lower intermediate level multiplexing module as a plurality of inputs for the intermediate level multiplexing module; and
a plurality of data registers, each operatively connected to a last level multiplexing module, each of the last level multiplexing modules having a plurality of inputs for receiving data from two or more data registers;
a multiplexer; and an addressing circuit receiving address information transmitted by the computer and programming the multiplexer to select one of the plurality of inputs of the multiplexing module as an output to be sent to the computer in response to the received address information.

2. The system of claim 1 wherein each of the multiplexing modules includes:

a direction controller controlling a direction of communication to allow receipt of address information from the computer, or to allow transmission of data from one of the plurality of data registers along a common pathway.

3. The system of claim 2 wherein the direction controller includes first and second monostable, multivibrator circuits connected in series;

the first monostable, multivibrator circuit being activated for a predetermined period of time by the initial receipt of the address information by the multiplexing module to allow completion of an addressing sequence; and the second monostable, multivibrator circuit being activated for a predetermined period of time by the deactivation of the first monostable, multivibrator circuit to reverse the direction of communication of the respective multiplexing module along a common pathway.

4. The communications system of claim 3 wherein each multiplexing module includes at least one transceiver having a receiver and a transmitter; and wherein in each multiplexing module each second monostable, multivibrator circuit is connected to the receiver and transmitter of each of the at least one transceiver to enable and disable each receiver and transmitter.

5. The system of claim 3 wherein the computer, the multiplexing modules, and the data registers are connected to each other via serial communications links; and wherein each multiplexing module includes:

an upstream transceiver having a receiver for receiving the
address information from the computer and a transmitter for transmitting data from a register to the computer, the second monostable, multivibrator circuit being connected to the receiver to disable and to the transmitter to enable when the second monostable, multivibrator circuit is activated; and wherein in each multiplexing module the addressing circuit includes a serial-to-parallel conversion circuit, connected to the receiver of the upstream transceiver and to the multiplexer converting received serial address information to parallel address information to program the multiplexer.

6. The system of claim 5 wherein the serial communications links are pairs of twisted wire; and the serial-to-parallel conversion circuit in each multiplexing module is a UART.

7. The system of claim 2 wherein each of the plurality of data registers are included in respective sensor modules, each sensor module repetitively transmitting data to a respective last level multiplexing module.

8. The system of claim 7 wherein each of said sensor modules further includes:

a transmit strobe generator, operatively connected to said sensor modules and a parallel-to-serial converter, repetitively outputting a strobe signal;

a parallel-to-serial converter, connected to the respective data register and the transmit strobe generator, converting parallel data output from the respective data register to serial data when a strobe signal is received from the transmit strobe generator; and a transmitter operatively connected to said parallel-to-serial converter, wherein said transmitter transmits the serial data to a respective one of the last level multiplexing modules.

9. The system of claim 4 further comprising:

a computer interface module connecting the first multiplexing module to the computer including;

a first transceiver receiving address information transmitted by the computer and transmitting data to the computer;

a second transceiver connected to the first transceiver having a transmitter to transmit address information received by the first transceiver to the first multiplexing module, and a receiver receiving data from the first multiplexing module and outputting data to the transmitter of the first transceiver;

a first direction controller connected to an enable/disable input of the transmitter of the second transmitter; and a second direction controller connected to an enable/disable input of the receiver of the second transceiver.

10. The system of claim 9 wherein the first and second direction controllers of the computer interface module include:

a first monostable, multivibrator circuit connected to a first transceiver; and a second monostable, multivibrator circuit connected in series to the respective first monostable, multivibrator circuit being activated by the deactivation of the respective first monostable, multivibrator circuit, and wherein the second monostable, multivibrator circuit of the first direction controller is connected to the enable/disable input of the transmitter of the second transceiver; and the second monostable, multivibrator circuit of the second direction controller is connected to the enable/disable input of the receiver of the second transceiver.

11. The system of claim 1 further comprising:

a plurality of serial links for directly connecting the first multiplexing module to each of the second multiplexing modules; and a plurality of third multiplexing modules arranged in groups, each group of third multiplexing modules operatively connecting to a corresponding second multiplexing module to a plurality of data registers.

12. The system of claim 11 wherein each of the second multiplexing modules includes an address propagation circuit allowing or preventing subsequently received address information to be communicated to the corresponding group of third multiplexing module in response to an output line of the addressing circuit.

13. The system of claim 12 wherein the output line of the addressing circuit outputs a high or low value in response to previously received address information transmitted by the computer.

14. The system of claim 13 wherein the address propagation circuit is an OR gate.

15. The system of claim 1 wherein
said first multiplexing module is directly connected to each of the plurality of second multiplexing modules via respective serial links;
the first multiplexing module includes a plurality of transceivers each respectively connected to a first end of a serial link; and
each of the second multiplexing modules includes a transceiver respectively connected to a second end of said serial link.

16. The system of claim 15 wherein each of the serial links are RS-422 bidirectional pathways.

17. The system of claim 15 wherein each of the multiplexing modules are positioned to minimize the total of the lengths of the serial links.

18. The system of claim 1 wherein
the computer repetitively sends address information to receive data from the same data register multiple times in order to ensure the accuracy of the received data.

* * * * *

UNITED STATES PATENT AND TRADEMARK OFFICE
CERTIFICATE OF CORRECTION

PATENT NO.    : 6,493,363 B1
DATED         : December 10, 2002
INVENTOR(S)   : Dennis Shuman, David K. Weaver and Aharon Dagan It is certified that error appears in the above-identified patent and that said Letters Patent is hereby corrected as shown below:

<u>Title page,</u>
Item [73], insert: -- University of Florida, Gainesville, FL --

Signed and Sealed this

Thirteenth Day of May, 2003

JAMES E. ROGAN
*Director of the United States Patent and Trademark Office*